United States Patent [19]

Reeder et al.

[11] Patent Number: 5,584,553
[45] Date of Patent: Dec. 17, 1996

[54] REUSABLE PRESENTATION FRAME FOR OVERHEAD TRANSPARENCIES

[75] Inventors: Laurence B. Reeder, Upland; Anahit Tataryan; Daisy Taw, both of Temple City, all of Calif.

[73] Assignee: Avery Dennison Corporation, Pasadena, Calif.

[21] Appl. No.: 268,256

[22] Filed: Jun. 29, 1994

[51] Int. Cl.⁶ .................................................. G03B 21/14
[52] U.S. Cl. ...................... 353/120; 353/97; 353/DIG. 3
[58] Field of Search ........................ 353/120, 97, DIG. 3

[56] References Cited

U.S. PATENT DOCUMENTS

| | | |
|---|---|---|
| 3,264,797 | 8/1966 | Powling et al. . |
| 3,269,261 | 8/1966 | Porter . |
| 3,280,493 | 10/1966 | Newman . |
| 3,281,977 | 11/1966 | Koontz ................................. 40/158 |
| 3,299,557 | 1/1967 | Schultz ................................. 40/158 |
| 3,372,505 | 3/1968 | Wright ................................. 40/158 |
| 4,203,659 | 5/1980 | Constantine et al. ................... 353/120 |
| 4,679,923 | 7/1987 | Nielsen ................................. 353/120 |
| 4,688,910 | 8/1987 | Deary ................................... 353/97 |
| 4,732,468 | 3/1988 | Wright ............................... 353/DIG. 5 |
| 5,121,984 | 6/1992 | Jones et al. ............................ 353/97 |
| 5,237,355 | 8/1993 | Kiehne et al. ......................... 353/120 |
| 5,469,235 | 11/1995 | Zako ..................................... 353/97 |

*Primary Examiner*—William Dowling
*Attorney, Agent, or Firm*—Poms, Smith, Lande & Rose, P.C.

[57] ABSTRACT

A reusable presentation frame for overhead transparencies that has a view window through which a transparency may be revealed. The presentation frame has a "track" through which an opaque sliding concealment (slider) means may slide and thus conceal a variable portion of the transparency. The presentation frame may be constructed by bonding together multiple levels each having a plurality of borders which define the view window. Starting at the bottom level, the levels may include at least one raiser level, a transparency entrance level through which an overhead transparency may be inserted, a first ledge level, a first track level, and a top frame. The opaque slider may be inserted through the first track level at a side without a border and movably positioned within the presentation frame. Alternate embodiments of the presentation frame may include additional sliders and additional tracks.

28 Claims, 2 Drawing Sheets

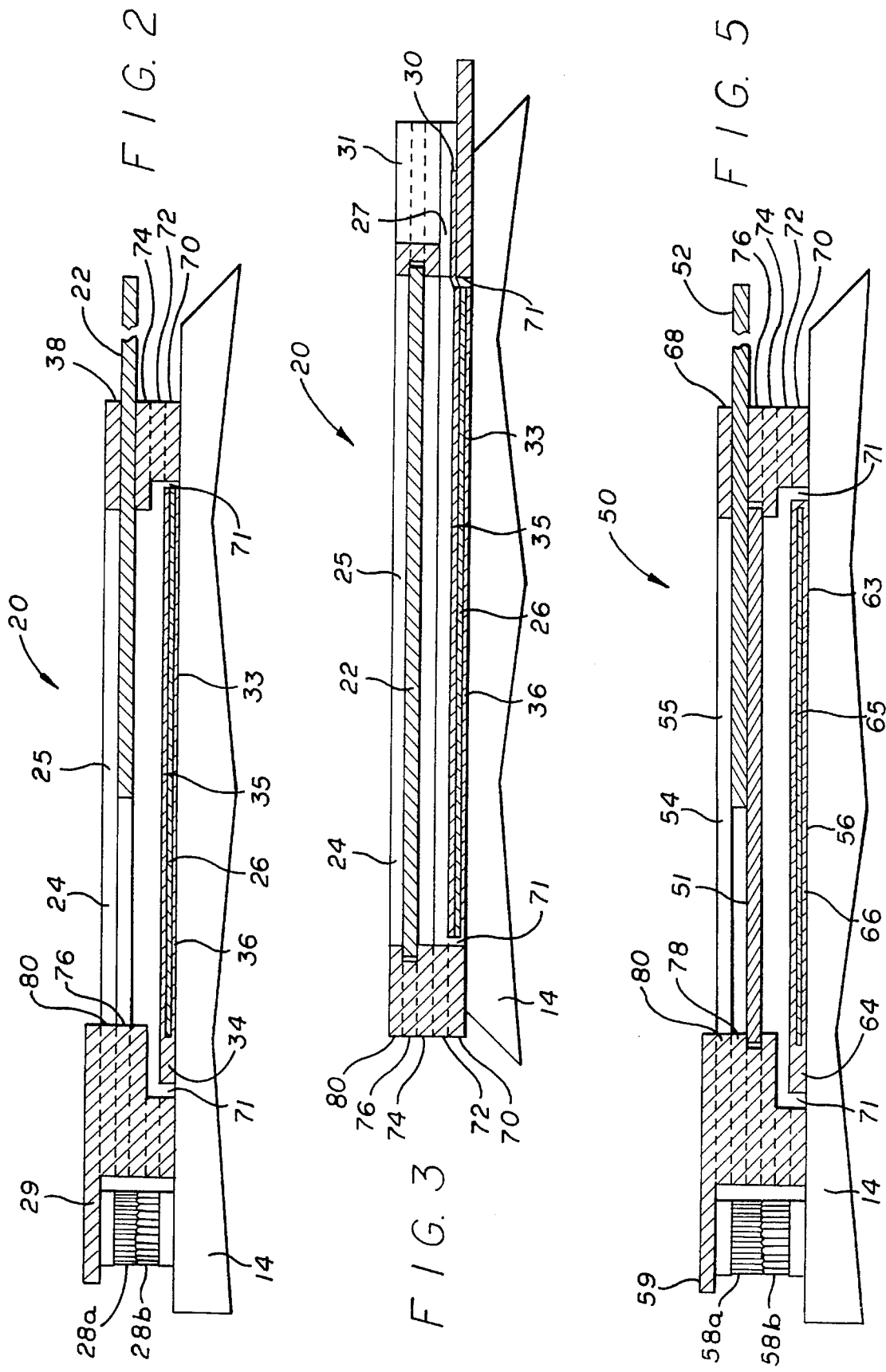

REUSABLE PRESENTATION FRAME FOR OVERHEAD TRANSPARENCIES

FIELD OF THE INVENTION

This invention relates to a presentation frame which allows overhead transparencies to be progressively revealed as they are projected by an overhead projector.

BACKGROUND OF THE INVENTION

Overhead projectors are often used for making presentations of printed matter, sketches, charts, and the like, such as those presentations made by salesmen, executives, or teachers. Clear sheets (transparencies) are prepared with images of the matter to be presented and then the transparencies are positioned on a transparency platform of the overhead projector during the presentation. The overhead projector then projects the image of the transparency onto a screen, wall or other, preferably flat, projection surface.

Many overhead transparency presentations are plagued with the following problems: as each transparency is replaced on the transparency platform, proper orientation must be established for each transparency requiring the presenter to determine if the audience can see each image and requiring the transparency to be moved "up and down" and from "side-to-side" until it is properly oriented; the transparencies are often smaller than the overhead projector's light area, causing transparencies to be surrounded by unwanted bright light; if a transparency is touched during the presentation, they will often move on the transparency platform and require readjustment; as transparencies are changed during a presentation, a blank projector screen can become annoying and detract from a presentation; transparencies that are constantly reused can get smudged and soiled, detracting from the presentation; a presenter may need to write or otherwise mark a slide during a presentation which causes the slide to be spoiled or stained; transparencies are often stored or filed in a folder after a presentation, causing the transparencies to become bent and difficult to use for other presentations; and a "pile of transparencies" is difficult to work with while standing at the projector, and individual transparencies are difficult to locate during a presentation. Using a loose sheet of covering paper to progressively reveal the transparency is impractical because the covering paper will often move from or fall off the presentation platform. Further, some methods of covering all or part of the transparency allow "ghosting" such that a faint version of the image is projected. Finally, a presenter often wants to reveal only a part of a transparency.

The transparency presentation device described in U.S. Pat. No. 4,688,910 to Deary attempts to solve the problems associated with overhead transparency presentations. The Deary device includes a support frame having an aperture or view window through which light is projected. The support frame is secured to the presentation platform of an overhead projector and a box-like aperture cover having a top, bottom, and sidewalls encloses the support frame. The aperture cover may be moved from an open to a closed position alternately exposing and concealing the aperture. A transparency is preferably placed so that it extends across the aperture and lays above the top of the aperture cover. Although the Deary device solves some of the problems relating to overhead transparency presentations mentioned above, several problems persist. For example, since the transparency lies above the aperture cover, with overhead projectors having a light source incorporated in the lens assembly, the image on the transparency is "ghosted" onto the projection surface so that an audience is able to see the image faintly when the aperture cover is in the closed position. Another problem is caused by the thickness of the support frame and aperture cover. The thickness causes the image on transparency to be distorted or partially distorted along the edge of the aperture cover thus making it difficult to read and difficult to mark the transparency. Yet another problem is that the aperture cover of the Deary device only allows the gradual revealing of a transparency in one direction. The present invention prevents "ghosting", allows the transparency to lay flat on the transparency platform, and may allow gradual revealing of the transparency in multiple directions.

Accordingly, an object of the present invention is to provide a reusable presentation frame for overhead transparencies that establishes a single orientation and position for each presentation frame so that multiple overhead transparencies may be placed and replaced without need for reorientation. Another object of the present invention is to provide a means for eliminating unwanted bright light when a transparency is smaller than the light area of the overhead projector. A further object of the present invention is to prevent transparencies that are constantly reused from getting smudged and soiled and thus detracting from the presentation. Yet another object of the present invention is to provide a means for easy storage or filing in binders when the transparencies are not in use. Further, an object of the present invention is to provide a means for preventing the "ghosting" of an image. Finally, an additional object of the present invention is to allow a range of concealment of overhead transparencies as they are projected by an overhead projector.

BRIEF SUMMARY OF THE INVENTION

In accordance with the present invention, a reusable presentation frame for overhead transparencies preferably includes a frame having a view window through which a transparency may be revealed. The frame preferably includes "track" means which allow an opaque sliding concealment means to slide and thus conceal a variable portion of the transparency as it slides through the track means.

The presentation frame may be constructed using several levels of sheet material which are bonded together. Each level may have a plurality of borders which together form a four-sided frame around the view window. Starting at the bottom level, the levels may include at least one raiser level preferably including four borders, a transparency entrance level through which an overhead transparency may be inserted preferably having three borders, a first ledge level preferably having four borders, a first track level preferably having at least two borders on opposite sides of the overhead projector, and a top frame preferably having four borders. An opaque slider may be inserted through the first track level at a side without a border. The opaque slider may be movably positioned in the presentation frame to progressively reveal the transparency.

The preferred embodiment of the invention may also include the following additional features:

1. The apparatus includes at least one slider and may include two, three, or more additional sliders which allow the user to conceal a range of a transparency from one or more sides.

2. The frame and each slider are preferably constructed from opaque material such as cardboard, plastic, wood, or metal.

3. Each slider may include a means for gripping such as a finger hole, a pull tab, or a non-slip gripping surface.

4. Appropriate sides and/or levels may include means through which the means for gripping on each slider may be gripped such as a notch or indentation.

5. The apparatus may be constructed in layers or made as a solid unit.

6. The presentation frame may include reusable fastening means such as VELCRO (hook and loop), magnets, or other mechanical means that removably attach the frame to the overhead projector.

7. The presentation frame may include a protective cover for the transparency which further includes means for holding the protective cover within a binder.

8. The slider may be movably positioned within the presentation frame so as to allow a range of concealment of the overhead transparency in a landscape mode (so that the transparency has greater width than height), a portrait mode (so that the transparency has greater height than width), both the landscape and portrait modes simultaneously, or in other combinations.

One advantage of the present invention is that it assures that transparencies placed on an overhead projector are centered, straight, and at the proper height for viewing. Another advantage is that the presentation frame blocks out unwanted light surrounding the image on the transparency. Further, the present invention allows a presenter to reveal one line or a specific portion of an image at a time. Yet another advantage of the present invention is that it is portable and may be used on all makes and models of overhead projectors without the "ghosting" often associated with other devices.

Other objects, features and advantages of the present invention will become apparent from a consideration of the following detailed description, and from the accompanying drawings.

BRIEF DESCRIPTION OF THE DRAWINGS

FIG. 2 is an enlarged sectional view of the preferred single-slider embodiment of the invention taken at line 2—2 of FIG. 1;

FIG. 3 is an enlarged sectional view of the preferred single-slider embodiment of the invention taken along line 3—3 of FIG. 1;

FIG. 5 is an enlarged sectional view of an alternate dual-slider embodiment of the present invention as shown in FIG. 4.

DETAILED DESCRIPTION OF THE PREFERRED EMBODIMENTS

Figure 1:
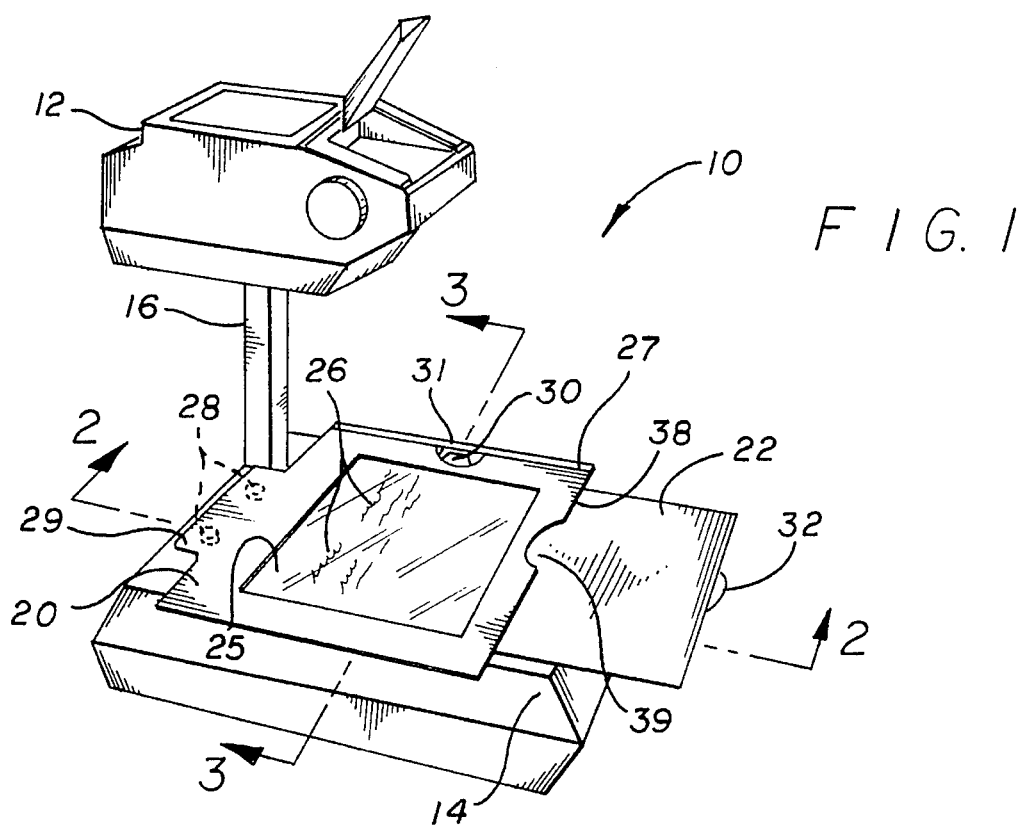
FIG. 1 is a perspective view of an overhead projector and a preferred single-slider embodiment of the reusable presentation frame for overhead transparencies.

Referring more particularly to the drawings, FIG. 1 is a perspective view of an overhead projector 10 and an embodiment of the invention having a single slider 22 for the reusable presentation frame 20 for overhead transparencies. As shown in FIG. 1, the presentation frame 20 is preferably used in conjunction with an overhead projector 10 having a lens assembly 12 and a transparency platform 14. A projector neck 16 preferably separates and supports the lens assembly 12 from the transparency platform 14. The overhead projector 10 is preferably configured so that the lens assembly 12 is positioned above the transparency platform 14. Many types of overhead projectors are currently available. One type of overhead projector has a light source incorporated with the lens assembly 12. This type of overhead projector is particularly suited to the present invention because the present invention prevents the "ghosting" which is usually present when using traditional devices. Another type of overhead projector has a light source incorporated in the transparency platform. The present invention may be used with these or other types of overhead projectors.

With reference to FIGS. 1, 2 and 3, a first embodiment of the present invention includes a presentation frame 20 including a single slider 22. The presentation frame 20 has an inner frame edge 24 defining an opening or "view window" 25 through which a transparency 26 may be viewed. The presentation frame 20 may be affixed to the transparency platform 14 by means of fasteners 28. The fasteners may be located on an extended fastener section 29. The fasteners 28 may alternatively be located in alternate positions on the presentation frame 20, such as at the corners or edge of the presentation frame 20. As shown in FIG. 2, the fasteners may be upper 28a and lower 28b sections of VELCRO. The fasteners may also be magnets, snaps, hooks, tape, or other mechanical connection means which preferably allow the presentation frame 20 to be easily removed from and reapplied to an overhead projector 10.

The presentation frame 20 of FIGS. 1–3 includes a single slider 22 which reveals a transparency 26 as it is pulled out of the presentation frame 20 through slot 38. As the slider 22 is pushed into the frame 20, the transparency 26 is concealed. The single slider 22 may reveal the transparency either in landscape (so that the transparency has greater width than height) or in portrait (so that the transparency has greater height than width) orientations. The slider 22 may include an optional pull tab 32 or other means by which the slider can be gripped. The slider 22 is preferably a sheet of cardboard or thick paper. The slider 22 may also be made of other opaque materials such as plastic, wood, stiff rubber, or metal. The presentation frame 20 may also include an optional notch 39 (as shown in FIG. 1) through which the optional pull tab 32 may be gripped. Another embodiment would use translucent or darkened transparencies as a light blocking slider.

FIGS. 2 and 3 show sectional views of the different layers of the presentation frame 20. These levels are depicted by the dashed lines and are exaggerated in thickness for clarification. Each of the levels includes multiple borders which surround the view window 25. More specifically, the presentation frame may include at least one "raiser" level 70 which lays on the projector platform 14 and raises the presentation frame 20 over the transparency 26. The raiser level 70 preferably includes four borders forming a frame having an inner edge 71 which is slightly larger than the transparency 26 or its protective cover 33. The present invention may include more than one raiser level 70 to accommodate thick transparencies. Further the four borders of the raiser level 70 may be adjusted in width to perform alternate functions such as acting as a "lip" on which the optional transparency pull tab 30 may rest.

A "transparency entrance" level 72 is preferably included above the raiser level 70. The transparency entrance level 72 preferably has three borders. The fourth side provides an entrance 27 into which the transparency 26 may be inserted. The three borders of the transparency entrance level 72 are approximately of equal width as the respective borders of the raiser level 70.

The level above the transparency entrance level 72 is a "first ledge" level 74. As shown to advantage in FIG. 3, the first ledge level 74 may be used as a ledge upon which the slider 22 may slide. The first ledge level 74 preferably includes a four-sided frame having four borders. In the preferred embodiment, as shown in FIGS. 2 and 3, the two borders may be approximately the same width as respective borders of the raiser level 71 (FIG. 3) and two borders may be slightly wider than the respective borders of the raiser level 71 (FIG. 2). These border width ratios are meant to be exemplary and are not meant to limit the scope of the invention. Finally, as shown in FIG. 3, an optional notch 31 may be cut from first ledge level 74.

The level above the first ledge level 74 is preferably a "first track" level 76 which provides a track through which the slider 22 may slide. The first track level 76 preferably has three borders. The fourth side is an entrance 38 into which slider 22 may be inserted. As shown in FIG. 2, the width of the first track level border opposite the entrance 38 is the same width as the respective border of the first ledge level 74. As shown in FIG. 3 the borders of the first track level 76 on either side of the entrance 38 are preferably slightly narrower than the respective borders of the first ledge level 74. As shown in FIG. 3, an optional notch 31 may be cut from this level 76, to permit easier insertion and removal of the transparencies 26 within the transparent envelopes 33.

A "top frame" level 80 is preferably placed above the first track level 76. The top frame level 80 preferably includes four borders forming a frame. The four borders of the top frame level 80 preferably have the same dimensions as the four borders of the first ledge level 74. The top frame level 80 may also include an optional notch 31 to expose the optional transparency pull tab 30. An extended fastener section or level 29 may be added above the top frame level 80.

It should be noted that these levels are merely representative and not meant to limit the scope of the invention. For example, more than one first track level 74 may be used for thick sliders. Further, the extended fastener section 29 may be incorporated in another level such as the top frame level 80. Further, the width of the borders of the levels may vary and not affect the purpose of the level, and therefore the width of the borders does not affect the scope of the invention. It is also anticipated that additional optional notches may be cut out to allow for easy access to the optional pull tabs. FIG. 2 and FIG. 3 also show the transparency 26 in an optional protective cover or envelope 33 having an upper sheet 35 and a lower sheet 36. The protective cover 33 may also include a thicker section 34 which has holes so that the protective cover 33 may be inserted in a three ring binder. The protective cover 33 may also include an optional pull tab 30. The protective cover 33 prevents transparencies that are constantly reused from getting smudged and soiled. Further, a presenter may write or otherwise mark on the presentation cover 33 without soiling or staining the original transparency. The holes in the thicker section 34 may be adapted to fit any type of binder for example, a three ring binder. Storage in a binder allows easy location of individual transparencies during a presentation. Storage in a binder also prevents the transparencies from becoming bent or otherwise damaged.

Figure 4:
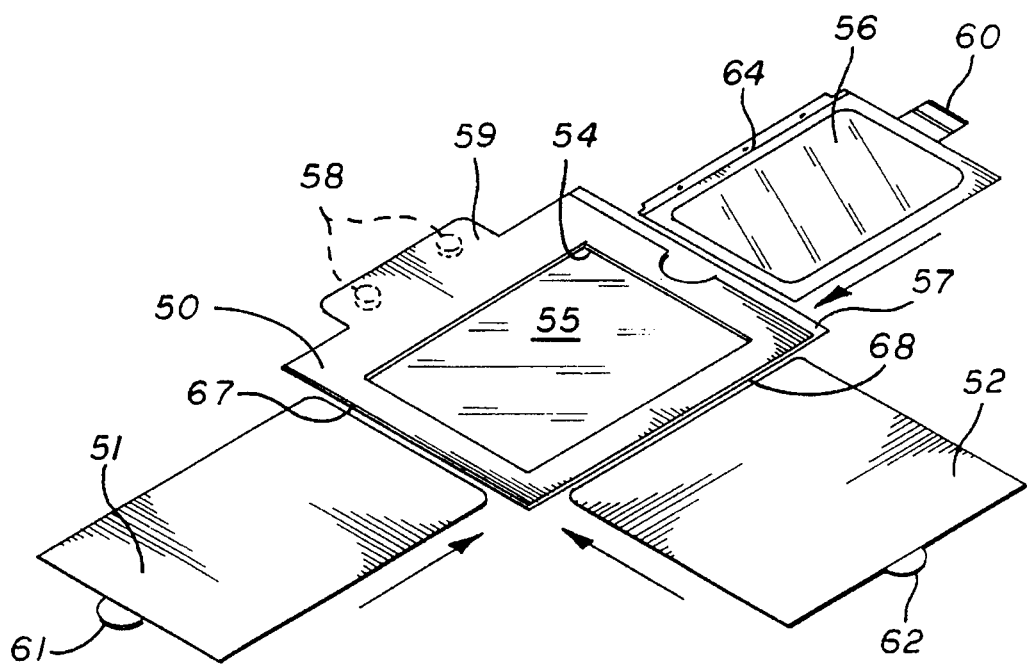
FIG. 4 is a plan view of an alternate dual-slider embodiment of the present invention.

FIG. 4 shows an alternate second embodiment of the present invention 50 having two sliders 51 and 52. The dual slider embodiment of the present invention 50 allows the presenter to use a single portrait slider 51, a single landscape slider 52, or both the portrait and landscape sliders 51 and 52. This allows a presenter to reveal the transparency in portrait, landscape, or one corner at a time. The sliders 51 and 52 may further include optional pull tabs 61 and 62. Variations of the sliders 51 and 52 discussed above for the slider 22 of the first embodiment also pertain to the slider of this second embodiment.

The second embodiment of the present invention includes a presentation frame 50 having an inner frame edge 54 defining an opening or "view window" 55 through which a transparency 56 may be viewed. The presentation frame 50 may be held to a transparency platform 14 by means of fasteners 58. The fasteners may be located on an extended fastener section 59. As shown in FIG. 5, the fasteners may be upper 58a and lower 58b sections of VELCRO. Variations of the fasteners 58 discussed above for the fasteners 28 of the first embodiment also pertain to the fasteners of this second embodiment.

FIG. 5 is a sectional view of the alternate second embodiment of the present invention. It shows the presentation platform 14 on which the transparency 56 has been laid. The transparency 56 is located in a protective cover 63 having an upper sheet 65 and a lower sheet 66. The protective cover 63 may also include a thicker section 64 which has holes to allow insertion into a binder. The protective cover 63 may also include an optional pull tab 60 (FIG. 4). Variations of the protective cover 63 discussed above for the protective cover 33 also pertain to this second embodiment.

FIG. 5 also shows the different levels of the presentation frame 50. As discussed above in relation to the levels of the first embodiment, the presentation frame 50 includes a "raiser" level 70, a "transparency entrance" level 72, a "first ledge" level 74, and a "first track" level 76. Since the second embodiment of the present invention preferably includes dual sliders 51 and 52, an additional "second track" level 78 is preferably included between the first track level 76 and a top frame level 80. The second track level 78 preferably has three borders. The fourth side is an entrance 68 through which slider 52 may be inserted. As shown in FIG. 5, the width of the second track level border opposite the entrance 68 is preferably the same width as the respective border of the first ledge level 74. The borders of the second track level 78 on either side of the entrance 68 are preferably slightly narrower than the respective borders of the first ledge level 74. It should be noted that a second ledge level (not shown) having approximately the same dimensions as the first ledge level 74 could be inserted between the first track level 76 and the second track level 78 to provide extra support.

A "top frame" level 80, as discussed above in relation to the first embodiment, may also be included in this second embodiment. An extended fastener section 59 may be added on top of the top frame 80. It should be noted that these levels are merely representative and not meant to limit the scope of the invention.

Alternate embodiments which include three or four sliders are hereby incorporated into the present invention. These sliders may be added by adding third and fourth track levels to the embodiment as the second track level 78 was added in FIG. 5. Alternatively, a third slider may be added by modifying the first track level 76 to include only two borders on either side of the slider entrance 38 thereby leaving the side opposite the slider entrance 38 open so that a third slider could be inserted. A fourth slider could be added by modifying the second track level 78 in a similar manner. The first embodiment could also be modified by only having two borders on the track level to accommodate two sliders which may be inserted at opposite sides of the frame. A fourth slider embodiment of the present invention would allow a presenter to isolate and reveal any section of the transparency.

Transparencies may be used with the present invention without a protective cover. Accordingly, an optional pull tab or optional holes may be incorporated with the transparencies of protective covers are not to be used.

The dimensions of the present invention may be adapted to suit any overhead projector and any transparency. In the embodiments discussed above, however, the view window (25, 55) may be approximately 8½"×11" with the different levels of the projection frame varying so as to accomplish appropriate tasks (for example, the track level 78 would be slightly larger by ⅛" or ¼" on each side so as to provide a track through which the slider would move). The slider would have a slightly smaller width than the track level (by approximately ¹⁄₁₆" or ¹⁄₃₂" on each side). The border of the frame would be approximately 1½" to 3" wide, but the width of the border would preferably be large enough to cover the transparency platform 14. The slider would be at least as deep as the view window and, if no optional pull tab is provided, would extend beyond the outside edge of the projection frame. In the embodiment shown in FIG. 4, for example, the portrait slider 61 would be approximately 8.625"×13" and the landscape slider 62 would be approximately 10.5"×11.125". The thickness of the levels, as discussed above, is exaggerated in the figures. Each level is preferably approximately 0.005" to 0.03" thick, but would vary depending on the materials used. In the embodiment having six levels, as shown in FIGS. 2 and 3, the total thickness would preferably be approximately 0.03" to 0.18". These dimensions are exemplary and are not meant to limit the scope of the invention.

In conclusion, it is to be understood that the present invention is not to be limited to that precisely as described hereinabove and as shown in the accompanying drawings. More specifically, the frame of the invention may be constructed in individual layers or in a single unit; between one and four sliders may be included; optional pull tabs and notches may be included or omitted for each slider and transparency; a protective cover may be used to prevent soiling or damage to the transparencies; the frame may be constructed on any opaque material such as paper, cardboard, plastic, wood, or metal; and the protective cover or the transparency may include holes to allow for easy insertion into a binder. Accordingly, the present invention is not limited to the arrangements precisely as shown and described hereinabove.

What is claimed is:

1. A presentation device for overhead transparencies constructed from several levels, each level having a plurality of borders, said borders forming a four-sided frame defining a view window, said presentation device comprising:

at least one raiser level having four borders;

a transparency entrance level through which an overhead transparency may be inserted, said transparency level being above said one raiser level, said transparency entrance level having three borders;

a first ledge level above said transparency entrance level, said first ledge level having four borders;

a first track level above said first ledge level, said first track level having at least two borders on opposite sides of the presentation device;

a top frame level above said first track level, said top frame level having four borders; and an opaque first slider which is inserted through said first track level at a side without a border, said first slider having means for sliding through said two borders of said first track level;

wherein said raiser level, transparency entrance level, first ledge level, first track level, and top frame level are joined to form an integral unit.

2. A presentation device in accordance with claim 1, wherein said first slider, raiser level, transparency entrance level, first ledge level, first track level, and top frame are made of opaque material.

3. A presentation device in accordance with claim 2, wherein said opaque material is cardboard.

4. A presentation device in accordance with claim 2, wherein said opaque material is plastic.

5. A presentation device in accordance with claim 1, wherein said first slider includes a means for gripping said first slider.

6. A presentation device in accordance with claim 5, wherein said first track level and said top frame level include means to allow gripping of said means for gripping said first slider.

7. A presentation device in accordance with claim 1 further comprising:

a second track level above said first track level and below said top frame level, said second track level having at least two borders on opposite sides of the presentation device; and an opaque second slider which is inserted through the second track level at a side without a border, said second slider having means for sliding through the at least two borders of the second track level.

8. A presentation device in accordance with claim 7, wherein said second slider includes means for gripping said second slider, said second track level includes means to allow gripping of said means for gripping said first slider and means to allow gripping of said means for gripping said second slider, and said top frame level includes means to allow gripping of said means for gripping said second slider and means to allow gripping of said means for gripping said second slider.

9. A presentation device in accordance with claim 7 further comprising a second ledge level above said first track level and below said second track level, wherein said second ledge level provides support for said second slider.

10. A presentation frame for an overhead transparency, said presentation frame comprising:

a four-sided frame encircling and defining a view window through which an overhead transparency can be viewed;

at least one side of said frame having an entrance slot in through which the overhead transparency can be inserted into a viewing position relative to said view window; and at least one side of said frame having an entrance slot through which a slider may be inserted so that the slider can be movably positioned relative to said frame so as to allow a range of concealment of said view window and thereby the overhead transparency.

11. A presentation frame according to claim 10, further comprising means attached to said frame for attaching said frame to an overhead projector.

12. A presentation frame according to claim 11, wherein said attaching means comprises hook-and-loop fasteners.

13. A presentation frame according to claim 10, further comprising a protective cover for the overhead transparency.

14. A presentation frame according to claim 13, further comprising means for holding said protective cover within a binder.

15. A presentation frame according to claim 13, wherein said protective cover has a pull tab.

16. A presentation frame according to claim 10, wherein the slider has a pull tab and said presentation frame has at least one notch which allows easy gripping of the slider.

17. A presentation frame according to claim 10, wherein the slider is movably positioned within said frame so as to allow a range of concealment of said view window in a landscape direction.

18. A presentation frame according to claim 10, wherein the slider is movably positionable within said frame so as to allow a range of concealment of said view window in a portrait direction.

19. A presentation frame according to claim 10, wherein the slider entrance slot side of said frame defines a frame first side, said slider entrance slot defines a first entrance slot through which a first slider can be inserted, said frame includes a second side having a second entrance slot through which a second slider can be inserted;

wherein the first slider is movably positionable within said frame so as to allow a range of concealment of said view window in a landscape direction; and wherein the second slider is movably positionable within said frame so as to allow a range of concealment of said view window in a portrait direction.

20. A presentation frame according to claim 10, wherein said overhead transparency entrance slot and said slider entrance slot are on different sides of said frame.

21. A presentation frame according to claim 20, wherein said different sides are disposed ninety degrees relative to one another.

22. A presentation frame according to claim 10, wherein said four sides of said frame are each opaque.

23. A presentation frame for an overhead transparency, said presentation frame comprising:

a four-sided frame defining a view window through which an overhead transparency may be viewed;

at least one side of said frame having an entrance through which the overhead transparency may be inserted; and a first side of said frame having an entrance through which a first slider can be inserted;

a second side of said frame having an entrance through which a second slider can be inserted;

wherein the first slider is movably positionable within said frame so as to allow a range of concealment of said view window in a landscape mode; and wherein the second slider is movably positionable within said frame so as to allow a range of concealment of said view window in a portrait mode.

24. A presentation frame for an overhead transparency, said presentation frame comprising:

a four-sided frame defining a view window through which an overhead transparency may be viewed;

at least one side of said frame having an entrance through which the overhead transparency may be inserted; and at least one side of said frame having an entrance through which a slider may be inserted;

wherein the slider is movably positionable within said frame so as to allow a range of concealment of said view window;

a protective cover for the overhead transparency; and means for holding said protective cover within a binder.

25. A presentation frame according to claim 24, wherein said protective cover has a pull tab.

26. A presentation frame according to claim 24, wherein the slider is opaque and has a pull tab, and at least one notch is provided to allow easy gripping of the opaque slider.

27. A presentation frame according to claim 24, wherein the slider may be movably positioned within said frame so as to allow a range of concealment of said view window in a landscape mode.

28. A presentation frame according to claim 24, wherein the slider may be movably positioned within said frame so as to allow a range of concealment of said view window in a portrait mode.

* * * * *